US012505327B2

(12) United States Patent
Baldischweiler (10) Patent No.: US 12,505,327 B2
(45) Date of Patent: Dec. 23, 2025

(54) CARD-SHAPED DATA CARRIER AND USE OF A CARD-SHAPED DATA CARRIER

(71) Applicant: Giesecke+Devrient ePayments GmbH, Munich (DE)

(72) Inventor: Michael Baldischweiler, Munich (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 18/670,821

(22) Filed: May 22, 2024

(65) Prior Publication Data

US 2024/0394500 A1    Nov. 28, 2024

(30) Foreign Application Priority Data

May 26, 2023    (DE) .......................... 102023113879.0

(51) Int. Cl.
*G06K 19/077*    (2006.01)

(52) U.S. Cl.
CPC ................. *G06K 19/0772* (2013.01)

(58) Field of Classification Search
CPC .... G06K 19/0772; G06K 19/00; G06K 19/07; G06Q 20/34; G06Q 20/341
USPC .................. 235/492, 487, 380, 375
See application file for complete search history.

(56) References Cited

U.S. PATENT DOCUMENTS

| | | | |
|---|---|---|---|
| 6,554,193 B1 | 4/2003 | Fehrman et al. | |
| 2003/0132302 A1* | 7/2003 | Hattori | G06K 19/07749 235/492 |
| 2005/0127529 A1* | 6/2005 | Huang | H01L 24/03 438/612 |
| 2010/0078489 A1* | 4/2010 | Winkler | B42D 25/23 156/60 |
| 2013/0277432 A1* | 10/2013 | Katworapattra | G06K 19/07745 235/488 |
| 2015/0069132 A1* | 3/2015 | Pueschner | H01L 21/56 235/488 |
| 2021/0110231 A1* | 4/2021 | Finn | G06K 19/025 |
| 2022/0363953 A1 | 11/2022 | Odaka et al. | |

FOREIGN PATENT DOCUMENTS

| | | | | |
|---|---|---|---|---|
| CA | 3058293 A1 | * | 11/2018 | ........... H01Q 1/2225 |
| CN | 104134634 A | * | 11/2014 | ....... G06K 19/07728 |
| DE | 19616424 A1 | | 10/1997 | |
| EP | 2775426 A1 | | 9/2014 | |

(Continued)

OTHER PUBLICATIONS

German Search Report from corresponding DE Application No. 102023113879.0, Mar. 5, 2023.

(Continued)

*Primary Examiner* — Edwyn Labaze
(74) *Attorney, Agent, or Firm* — Workman Nydegger (57) ABSTRACT

A card-shaped data carrier includes a card body, a chip element, and a stabilization structure. The chip element is received in the card body and has a peripheral chip element edge, which defines a transition area peripherally around the chip element and between the chip element and the card body. The stabilization structure is arranged in the card body and extends at least in some sections in the transition area and provides a structural reinforcement of the transition area.

12 Claims, 5 Drawing Sheets

(56) References Cited

FOREIGN PATENT DOCUMENTS

WO      2015097400 A1    7/2015

OTHER PUBLICATIONS

Berliner Zeitung: Müll aus dem Meer: Berliner Bank verteiltkünftig Karten aus Ozeanplastik. Retrieved May 21, 2024, from https://www.berlinerzeitung.de/news/berlininnovation-bezahlen-mit-muellaus-dem-meer-sparda-bankverteilt-ec-karten-aus-ozeanplastik-li.250243, "Garbage from the sea: Berliner Bank with distribute cards made from ocena plastic in the future," available as early as Jul. 25, 2022.

PrintPlast: Wooden Key Card, "World's Most Sustainable RFID Cards," URL: https://www.printplast.com/de/holzkarte-rfid/, Retrieved May 21, 2024, available as early as Jan. 21, 2022.

European Search Report from Corresponding European Patent Application No. EP24174415, Oct. 11, 2024.

\* cited by examiner

CARD-SHAPED DATA CARRIER AND USE OF A CARD-SHAPED DATA CARRIER

FIELD OF THE INVENTION

The present invention relates to card-shaped data carriers. In particular, the invention relates to a card-shaped data carrier having improved fracture stability, in particular in the transition area between a chip element and the card body, and a use of such a card-shaped data carrier.

BACKGROUND OF THE INVENTION

Card-shaped data carriers are presently used in a variety of areas of application. For example, such data carriers can be used for cashless payment for products or services, for establishing personal identity, or for access to Internet-based applications. Accordingly, for example, there are card-shaped data carriers in the form of chip cards in general, payment cards, such as credit cards or debit cards, and personal identification or identity cards. Such card-shaped data carriers typically have chip elements which implement corresponding functions of the card-shaped data carrier.

In consideration of progressing efforts for environmental protection, card-shaped data carriers are increasingly manufactured from recyclable and/or biodegradable materials, such as wood, recycled PVC, and ocean plastic. However, card-shaped data carriers manufactured from such materials have a lower stiffness than "normal" PVC cards. Due to the lower thickness of the card body prevailing there, this applies in particular in the area of the transition between the chip element edge and the card body. Therefore, breaks occur in the area of the chip element edge faster than with normal PVC cards, which can result in the breaking of connection lines of coils associated with the chip element. Moreover, with wood cards, tensions and also moisture absorption or drying and thus warping of the material can occur solely due to the wood structure. The wood card then has curves, which sometimes become so strong that the card can no longer be inserted into a card slot.

SUMMARY

Accordingly, it is an object of the present invention to improve the fracture stability of card-shaped data carriers.

This object is achieved by the subject matter of the independent claim. Exemplary embodiments result from the dependent claims and the following description.

According to a first aspect, a card-shaped data carrier is provided. The card-shaped data carrier comprises a card body, a chip element, and at least one stabilization structure. The chip element is accommodated in the card body and has a peripheral chip element edge, which defines a transition area peripherally around the chip element and between the chip element and the card body. The stabilization structure is arranged in the card body and extends at least in some sections in the transition area and thus provides a structural reinforcement of the transition area.

The card-shaped data carrier can be, for example, an identification card, an identity card (ID card), a chip card, smart card, or payment card, such as a credit card or debit card, or any other card which comprises a chip element.

The card-shaped data carrier can comprise a plastic material or natural material (such as wood) which forms the card body of the card-shaped data carrier. In particular, the card body can be manufactured from recyclable and/or biodegradable materials. However, it is to be noted that the described structure can also improve the fracture stability in normal PVC cards. The card body can be formed flat and can furthermore be constructed in multiple layers, which are created in a lamination process during the production of the card body. For example, the card body can have a base structure and a surface layer, i.e., a so-called overlay. The card body can also comprise one or a plurality of security features, such as a security chip, in the area of the card body surface, etc.

The chip element implements a functional interface and logical functions of the card-shaped data carrier. The chip element can be arranged, for example, in a recess (for example a milled groove) of the card body and can form an essentially planar or flush surface together with the card body. The chip element has the peripheral chip element edge, which represents an outer periphery of the chip element (with respect to the common plane of the card body and the chip element), i.e., an outer peripheral edge, and thus defines a transition between the chip element and the card body at this periphery. The surrounding area of this transition, i.e., the area directly within the periphery and directly outside the periphery, is designated herein as the transition area. This transition area forms a structural weak point of the card body, since the thickness of the card body decreases there due to the recess and the card body therefore breaks more easily. This is the case in particular in card-shaped data carriers which are manufactured from recyclable materials (such as rPVC, ocean plastic) and/or biodegradable materials (such as wood).

To increase the fracture stability, a stabilization structure is therefore arranged in the card body. The stabilization structure is a mechanical structure, such as a wire (for example, a metallic wire, such as a copper wire) or any other suitable stabilizing element. The stabilization structure is arranged in a vertical direction, i.e., in a direction between a front surface and a rear surface of the card body, between the chip element and the card body. For example, the stabilization structure can be located in a recess at the front surface of the card body under the chip element and extends in corresponding planar extension directions, i.e., in directions which are defined by the planar extension of the card body (extend in the surface defined by the card body). The stabilization structure extends here in these planar extension directions at least in sections in the peripheral transition area between the chip element and the card body. In other words, the stabilization structure is arranged below the chip element and extends outward from below the chip element at least partially beyond the lateral edges or the periphery of the chip element, so that the stabilization structure at least partially (for example at least at one edge of the chip element) structurally reinforces the transition area. For this purpose, the stabilization structure can extend, for example, in a periodic pattern from inside the periphery of the chip element to outside the periphery and back again. The more such transitions are created here, the more stable is the transition area at the corresponding point.

The stabilization structure can be, for example, part of a coil associated with the chip element (such as an IDC inlay coil) or another functional element (such as a copper wire which is provided for the coil connection) or can be an additional element, such as an additionally accommodated wire, which is passive with respect to the function of the chip element itself, and is arranged and shaped accordingly, as described below. For example, in a coil, the outermost turn can be shaped accordingly in order to extend periodically, as described above, through the peripheral transition area accordingly. However, the stabilization structure can also extend beyond the pure transition area (i.e., beyond the area of the card body in the immediate vicinity of the chip element), for example, extensively through the card body. This is advantageous in particular with wood cards, since warping of the card body is extensively prevented in this way.

According to one embodiment, the card body is manufactured from a recyclable and/or biodegradable material.

Such materials are increasingly used due to environmental protection for card-shaped data carriers, such as credit cards, but due to the lower stiffness tend toward breaks especially in the transition area between chip element and card body, which can damage internal wires. The described stabilization structure counteracts this.

According to a further embodiment, the card body is manufactured from recycled PVC (rPVC, recycled polyvinyl chloride) and/or ocean plastic.

According to a further embodiment, the card body is manufactured from wood.

According to a further embodiment, the stabilization structure comprises a coil associated with the chip element, which is arranged under the chip element and is rotated in relation to the chip element so that the coil extends at least partially in the transition area and thus provides a structural reinforcement of the card body at the transition area.

Such a coil can be, for example, a coupling coil of the card-shaped data carrier which is provided in any case. Such coils typically extend in the same orientation as the chip element in order to reinforce the coupling. Such a coil can be "turned out" of the orientation of the chip element, i.e., extend in a different (rotated) orientation, so that individual turn sides extend at angles through the transition area, i.e., at angles to the respective chip element edge, and thus provide a stabilization against breaks/kinks.

According to a further embodiment, the stabilization structure comprises a wire which is arranged in the card body and spans the transition area in a periodic structure at least in some sections.

For example, such a wire can be formed in a meandering, wavy, triangular, ramp-shaped, or any other periodic structure which repeatedly spans/traverses the transition area. It is to be noted here that the periodic structure does not necessarily mean that the structure has a uniform periodicity. Rather, this means that the structure traverses the transition area now and again and each traversal extends from below the chip element via the chip element edge to outside the chip element and back. The stabilization structure can be a single contiguous structure, which is arranged around the entire peripheral transition area. However, the structure can also consist of one individual or multiple individual non-contiguous structures, which each only cover parts of the transition area. For example, only horizontally or only vertically extending areas of the transition area can also be provided with the stabilization structure. Combinations of various forms of the periodic structure, for example, a combination of a meandering and a wavy structure, are also conceivable.

According to a further embodiment, the wire extends at least in some sections around the peripheral chip element edge. The wire extends over the transition area and has a meandering course at least in some sections.

In such a design, a main extension direction of the wire thus extends along the chip element edge and within the transition area. Within this main extension direction, the wire accordingly extends repeatedly from below the chip element to outside the chip element (i.e., beyond the periphery of the chip element) and back again, to thus provide a reinforcement of the transition area or the chip element edge. The stabilization structure always extends here within the card body. Structures other than a meandering structure, such as the above-described triangular, ramp-shaped, wavy, or any other suitable structure of the wire and any combination of these structures can also be provided.

According to a further embodiment, the wire extends at least in some sections around the peripheral chip element edge. The wire extends over the transition area and has at least in some sections one of a ramp-shaped, a triangular, and a curved course.

Moreover, any combination of these or further structures is also possible. For example, subareas of the peripheral transition area can also be provided with different such structures. Moreover, subareas of the transition area can also have no stabilization structure at all.

According to a further embodiment, the wire is an outer turn of a coil associated with the chip element.

As already described above, the coil can be, for example, a coupling coil, an IDC inlay coil, or any other coil associated with the chip element, which is provided in the card-shaped data carrier in any case. The outer turn of such a coil can then be formed as a stabilization structure as described above. In such an embodiment, the stabilization structure extends as a whole in the entire peripheral transition area. However, it is also conceivable that only subsections have the above-described structures (e.g., meandering, wavy, etc.). For example, only horizontal areas or only vertical areas can also have such structures. In the areas of the peripheral transition area in which no such structure is provided, the substructures in which a stabilization structure is provided are then conductively connected to one another, for example, by straight wire sections.

According to a second aspect, a use of the card-shaped data carrier described herein as an identification document, identity document, chip card, or payment card is specified.

DETAILED DESCRIPTION OF THE INVENTION

The illustrations in the figures are schematic and are not to scale. If the same reference signs are used in different figures in the following description of the figures, these designate identical or similar elements. However, identical or similar elements can also be designated by different reference signs.

Figure 1:
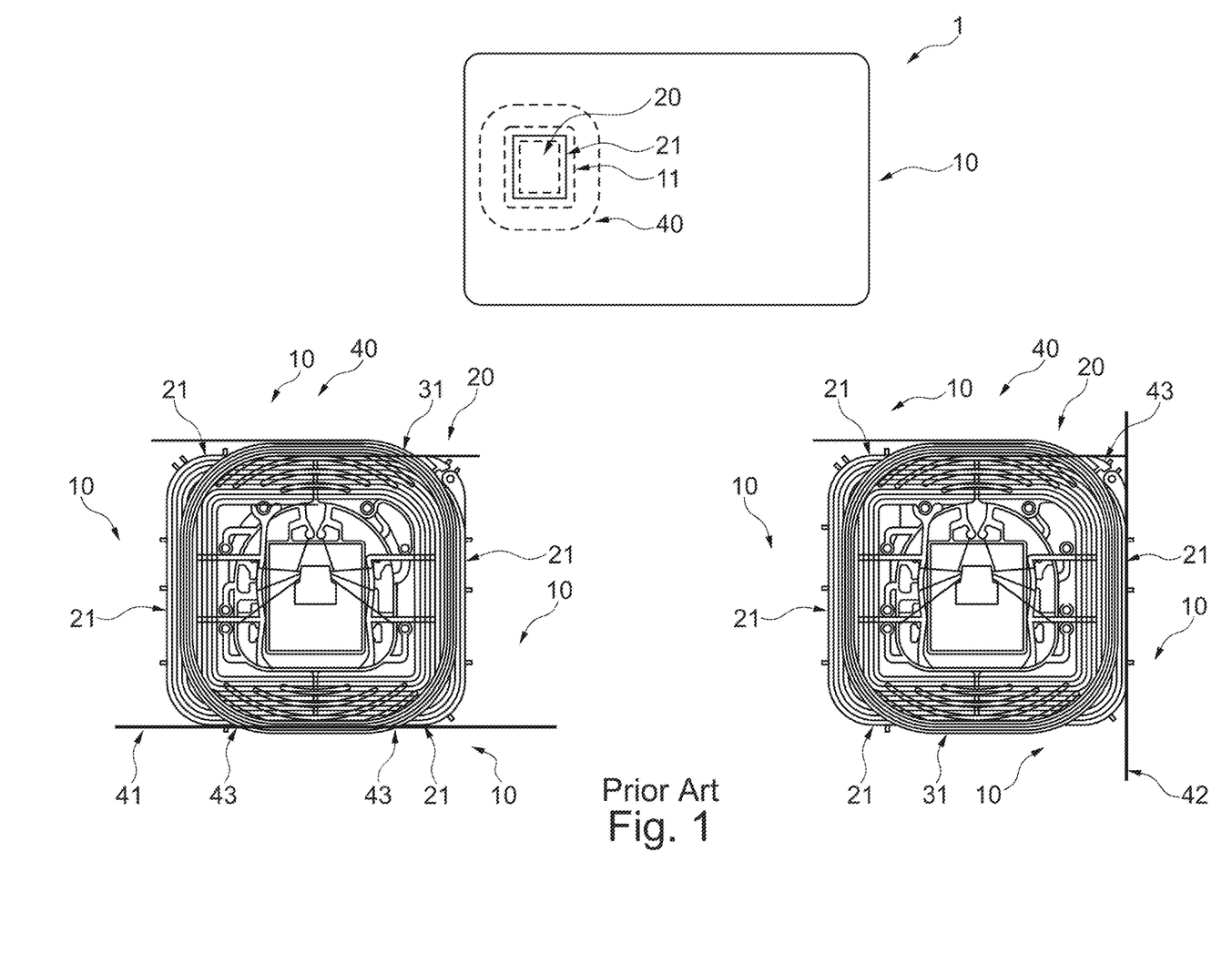
FIG. 1 shows a card-shaped data carrier from the prior art.

FIG. 1 shows a card-shaped data carrier 1 from the prior art. The external appearance of the card-shaped data carrier 1 shown in the upper area of FIG. 1 is, however, identical to the external appearance of the card-shaped data carrier 1 according to the invention, because of which the upper area of FIG. 1 is also referenced hereinafter with respect to FIGS. 2 to 5, which show exemplary embodiments of the card-shaped data carrier 1 according to the invention (or a chip element area 40 of such a data carrier, as indicated by the dashed circle in FIG. 1). Moreover, the transition area 11 discussed with respect to FIGS. 2 to 5 is indicated by dashed lines in FIG. 1.

The upper area of FIG. 1 shows a very schematic front view of the card-shaped data carrier 1. The card-shaped data carrier 1 has a card body 10 and a chip element 20, which is accommodated in the card body. For example, the card body can have a corresponding milled groove (not shown), in which the chip element 20 is received. The chip element 20 has a chip element edge 21, which defines the end of the chip element 20 and the beginning of the surrounding card body 10.

The lower area of FIG. 1 shows two flaw patterns in such a card-shaped data carrier 1 from the prior art. The chip element 20 is represented in each case here by a coil 31 (for example, coupling coil, IDC inlay coil), which is associated with the chip element (in particular is electrically or inductively coupled with the chip element) and which can be used, for example, in credit cards for contactless payment functions or which can implement other near field communication methods (NFC). A flaw pattern is shown on the left side of the lower part of FIG. 1, in which the card body 10 breaks along a horizontal breaking edge 42. A flaw pattern is shown on the right side of the lower part of FIG. 1, in which the card body 10 breaks along a vertical breaking edge 42. Wire breaks 43 of the coil 31 are shown in each case, which can occur at the breaking edges 41, 42. Such wire breaks 43 are prevented by the stabilization structure 30 (cf. FIGS. 2 to 5) provided in the card-shaped data carrier 1 according to the invention or the probability thereof is at least significantly reduced. This is advantageous in particular in card bodies which are manufactured from materials having low stiffness (rPVC, ocean plastic, wood, etc.).

Figure 2:
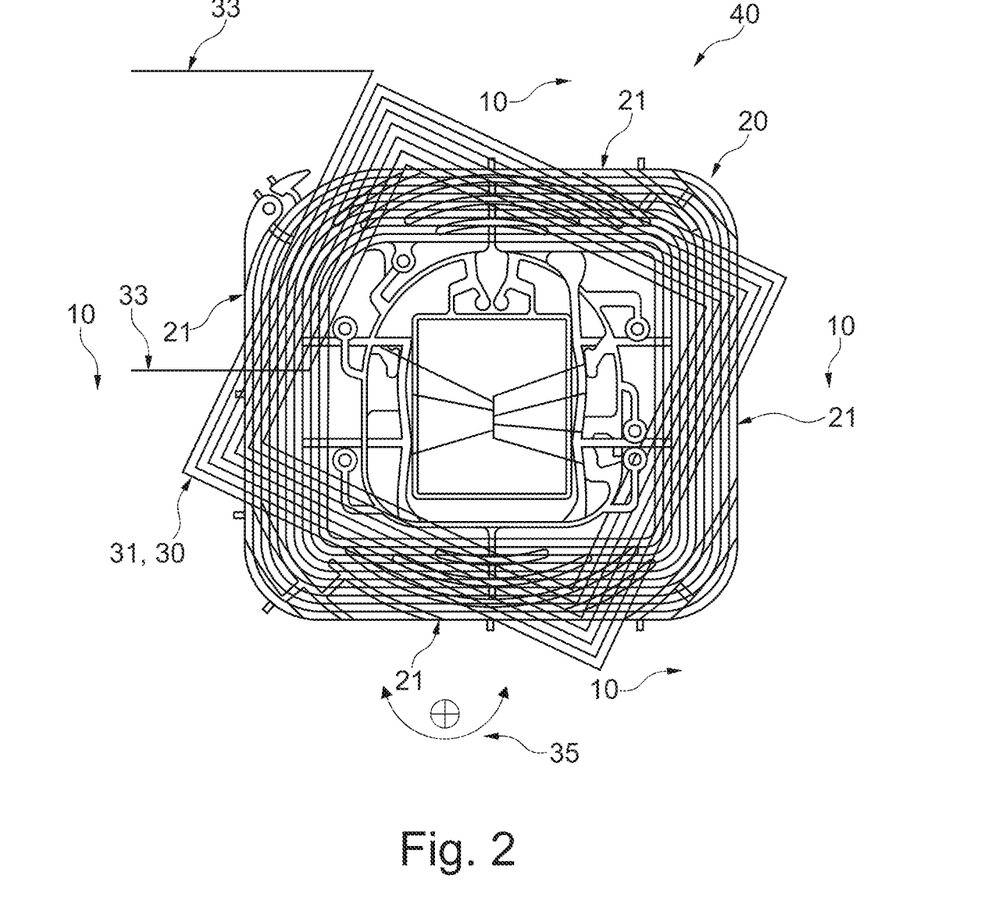
FIG. 2 shows a modified chip element area of a card-shaped data carrier having a coil rotated in relation to the chip element of the card-shaped data carrier, which acts as a stabilization structure.

FIG. 2 shows the chip element area 40 indicated in FIG. 1 according to a first exemplary embodiment of the card-shaped data carrier 1 according to the invention. As in the prior art, a chip element 20 is received in the card body 10 (not explicitly shown, rather only indicated by the reference sign 10). A coil 31 (as described above) assigned to the chip element 20 is also provided, which is functionally coupled to the chip element. The coil has connection lines 33 and is, in contrast to the prior art, rotated in relation to the chip element 20 along an axis of rotation 35 (indicated by a double arrow, the axis of rotation 35 extends perpendicular to the plane of the drawing, i.e., to the plane defined by the card body 10). The coil turns thus protrude at the corner areas beyond the chip element edge 21 (peripherally around the chip element 20) and thus extend partially in the transition area 11, which represents the area around the chip element edge 21 immediately inside and immediately outside the chip element edge 21 (see FIG. 1). The transition area is thus structurally reinforced and the flaw patterns described with reference to the lower part of FIG. 1 can be avoided or reduced.

Figure 3:
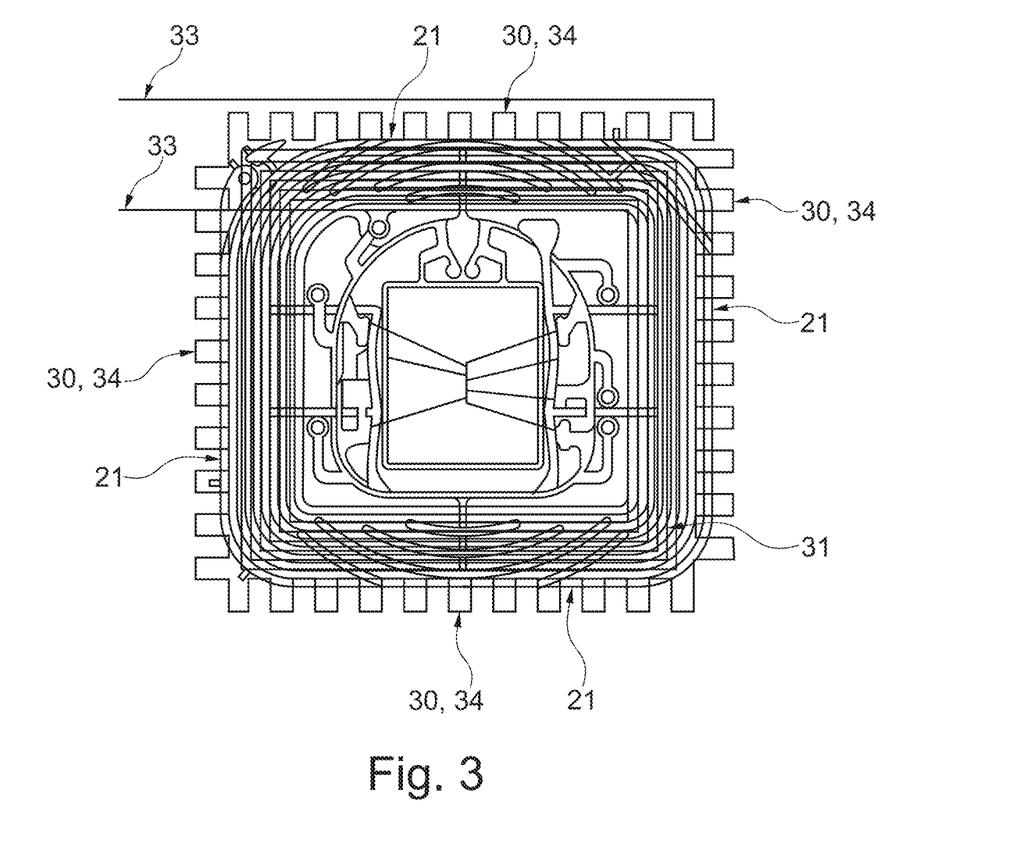
FIG. 3 shows a modified chip element area of a card-shaped data carrier having a meandering stabilization structure, which is designed as the outer turn of a coil.

FIG. 3 shows the chip element area 40 indicated in FIG. 1 according to a further exemplary embodiment of the card-shaped data carrier 1 according to the invention. The coil 30 is aligned in the same way here as the chip element 20. The stabilization structure 30 is defined by an outer turn 34 of the coil 30, which is designed as meandering around the peripheral transition area 11 and thus repeatedly traverses/spans the chip element edge 21 (and thus the transition area 11, cf. FIG. 1) in a periodic pattern. The card body is thus mechanically reinforced at the transition area 11, i.e., at the chip element edge 21. The wire 32 is designed as meandering in the configuration shown, but can also comprise other shapes, for example, a wave shape, a triangle shape, a ramp shape, or any other suitable shape.

Figure 4:
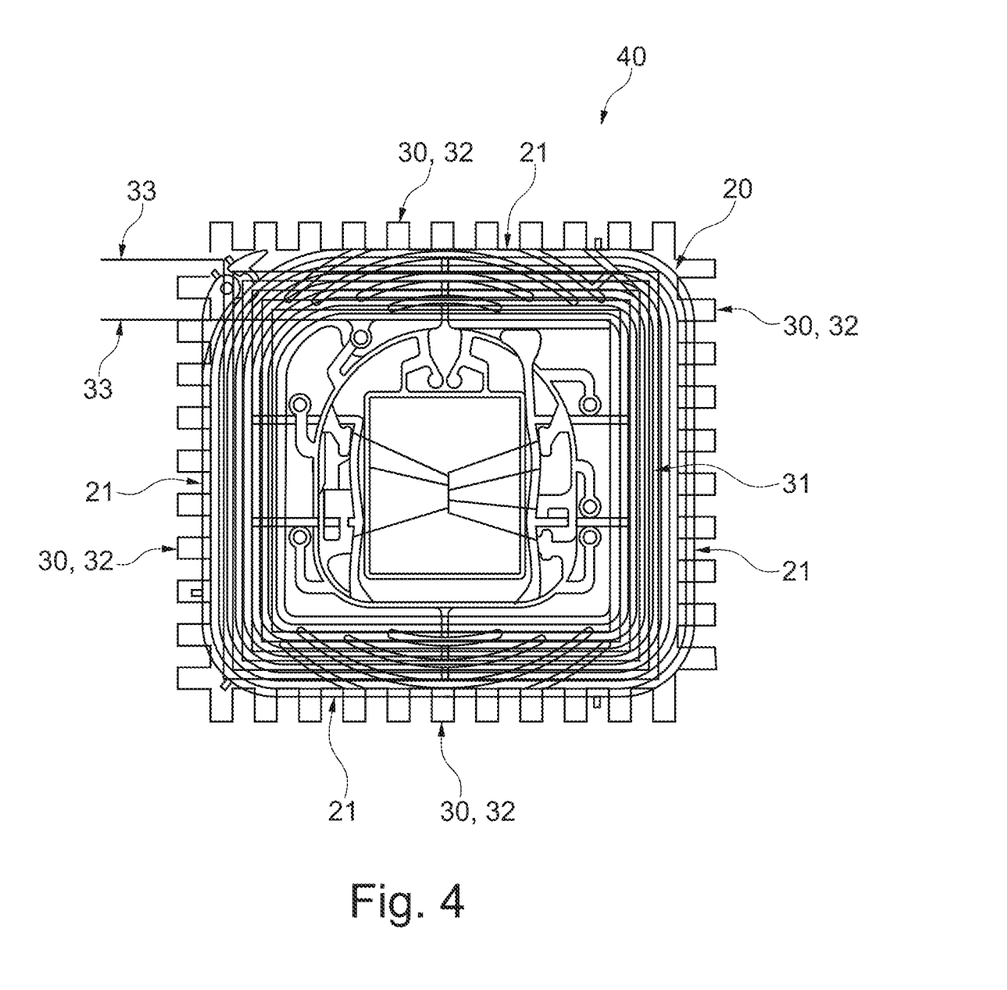
FIG. 4 shows a modified chip element area of a card-shaped data carrier having an additional meandering stabilization structure.

FIG. 4 shows the chip element area 40 indicated in FIG. 1 according to a further exemplary embodiment of the card-shaped data carrier 1 according to the invention. This exemplary embodiment differs from the exemplary embodiment of FIG. 3 in that the stabilization structure 30 is not an outer turn 34 of the coil 31, but rather an additionally inserted and correspondingly shaped wire 32, which is not electrically conductively connected to the coil 31. The wire 32 is also designed as meandering in the configuration shown, but can also comprise other suitable shapes, as described with reference to FIG. 3. Such a stabilization structure 30 also improves the mechanical stability of the card body 10 in the transition area 11.

Figure 5:
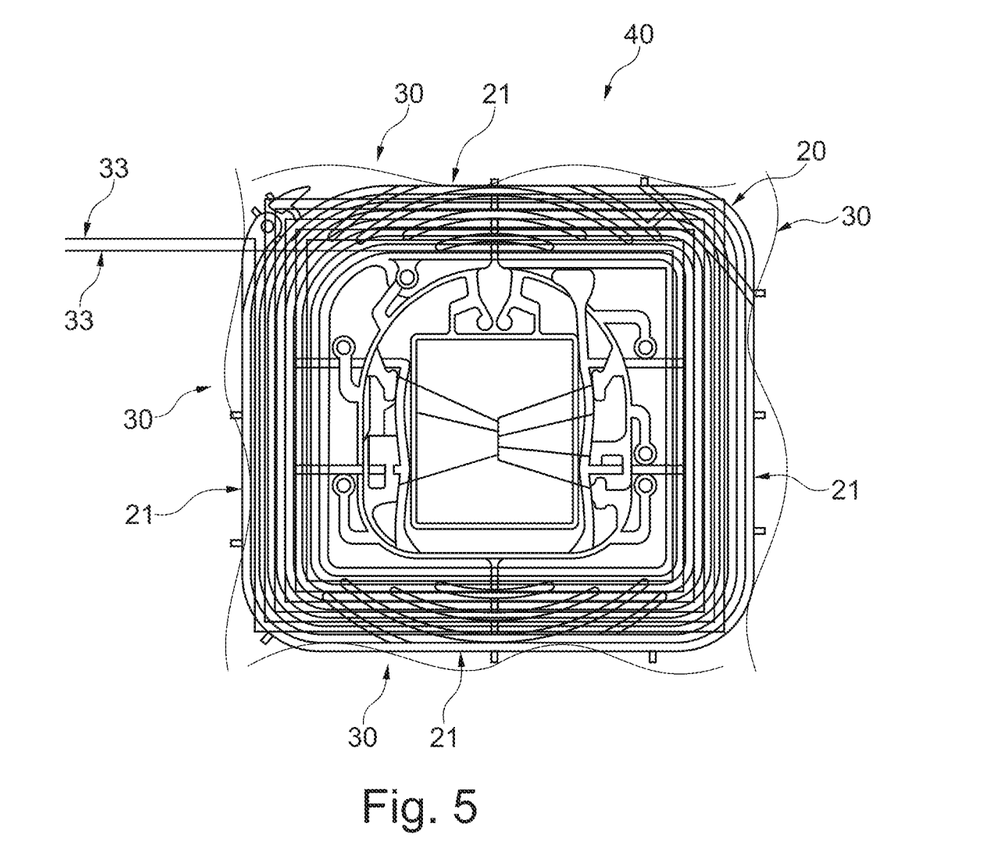
FIG. 5 shows a modified chip element area of a card-shaped data carrier having an additional wavy stabilization structure.

FIG. 5 shows the chip element area 40 indicated in FIG. 1 according to a further exemplary embodiment of the card-shaped data carrier 1 according to the invention. The configuration shown is similar to the configuration of FIG. 4. However, the wire 32, which is used as the stabilization structure 30, is divided here into four sub-segments on the four sides of the chip element 20, which are each designed as wavy and extend in the same way as described with reference to FIGS. 2 to 4 through the transition area 11 (cf. FIG. 1) and thus provide a structural reinforcement of the card body 10.

It is generally to be noted that the stabilization structure 30 can also only be provided on some sections of the transition area, for example, only on horizontal sections or only on vertical sections, in order to reinforce this area. Moreover, it is to be noted that any combinations of the shapes of the stabilization structure described herein can be performed and other shapes, which are not explicitly described but which are suitable for structural reinforcement, can also be used.

The invention claimed is:

1. A card-shaped data carrier, comprising:
   a card body;
   a chip element; and
   at least one stabilization structure;
   wherein the chip element is received in the card body and has a peripheral chip element edge, which defines a transition area peripherally around the chip element and between the chip element and the card body;
   wherein the stabilization structure is arranged in the card body and extends in the transition area and provides a structural reinforcement of the transition area;
   wherein the stabilizing structure is a single contiguous structure arranged about the transition area.

2. The card-shaped data carrier as claimed in claim 1, wherein the card body is manufactured from a recyclable and/or biodegradable material.

3. The card-shaped data carrier as claimed in claim 1, wherein the card body is manufactured from recycled PVC and/or ocean plastic.

4. The card-shaped data carrier as claimed in claim 1, wherein the card body is manufactured from wood.

5. The card-shaped data carrier as claimed in claim 1, wherein the stabilization structure comprises a coil assigned to the chip element, which is arranged below the chip element and is rotated in relation to the chip element so that the coil extends at least partially in the transition area and provides a structural reinforcement of the card body at the transition area.

6. The card-shaped data carrier as claimed in claim 1, wherein the stabilization structure comprises a wire, which is arranged in the card body and spans the transition area in a periodic structure.

7. The card-shaped data carrier as claimed in claim 6, wherein the wire extends around the peripheral chip element edge;
wherein the wire extends over the transition area and has a meandering course at least in some sections.

8. The card-shaped data carrier as claimed in claim 6, wherein the wire extends around the peripheral chip element edge;
wherein the wire extends over the transition area and at least in some sections has one of a ramp-shaped, a triangular, and a curved course.

9. The card-shaped data carrier as claimed in claim 6, wherein the wire is an outer turn of a coil associated with the chip element.

10. The use of a card-shaped data carrier as claimed in claim 1, as an identification document, identity document, chip card, or payment card.

11. A card-shaped data carrier, comprising:
a card body;
a chip element; and
at least one stabilization structure;
wherein the chip element is received in the card body and has a peripheral chip element edge, which defines a transition area peripherally around the chip element and between the chip element and the card body;
wherein the stabilization structure is arranged in the card body and extends at least in some sections in the transition area and provides a structural reinforcement of the transition area; and
wherein the stabilization structure comprises a coil assigned to the chip element, which is arranged below the chip element and is rotated in relation to the chip element so that the coil extends at least partially in the transition area and provides a structural reinforcement of the card body at the transition area.

12. A card-shaped data carrier, comprising:
a card body;
a chip element; and
at least one stabilization structure;
wherein the chip element is received in the card body and has a peripheral chip element edge, which defines a transition area peripherally around the chip element and between the chip element and the card body;
wherein the stabilization structure is arranged in the card body and extends at least in some sections in the transition area and provides a structural reinforcement of the transition area; and
wherein the stabilization structure comprises a wire, which is arranged in the card body and spans the transition area in a periodic structure at least in some sections.

\* \* \* \* \*